*William Lewis,*
*Stone Drill.*
N° 21,140. Patented Aug. 10, 1858.
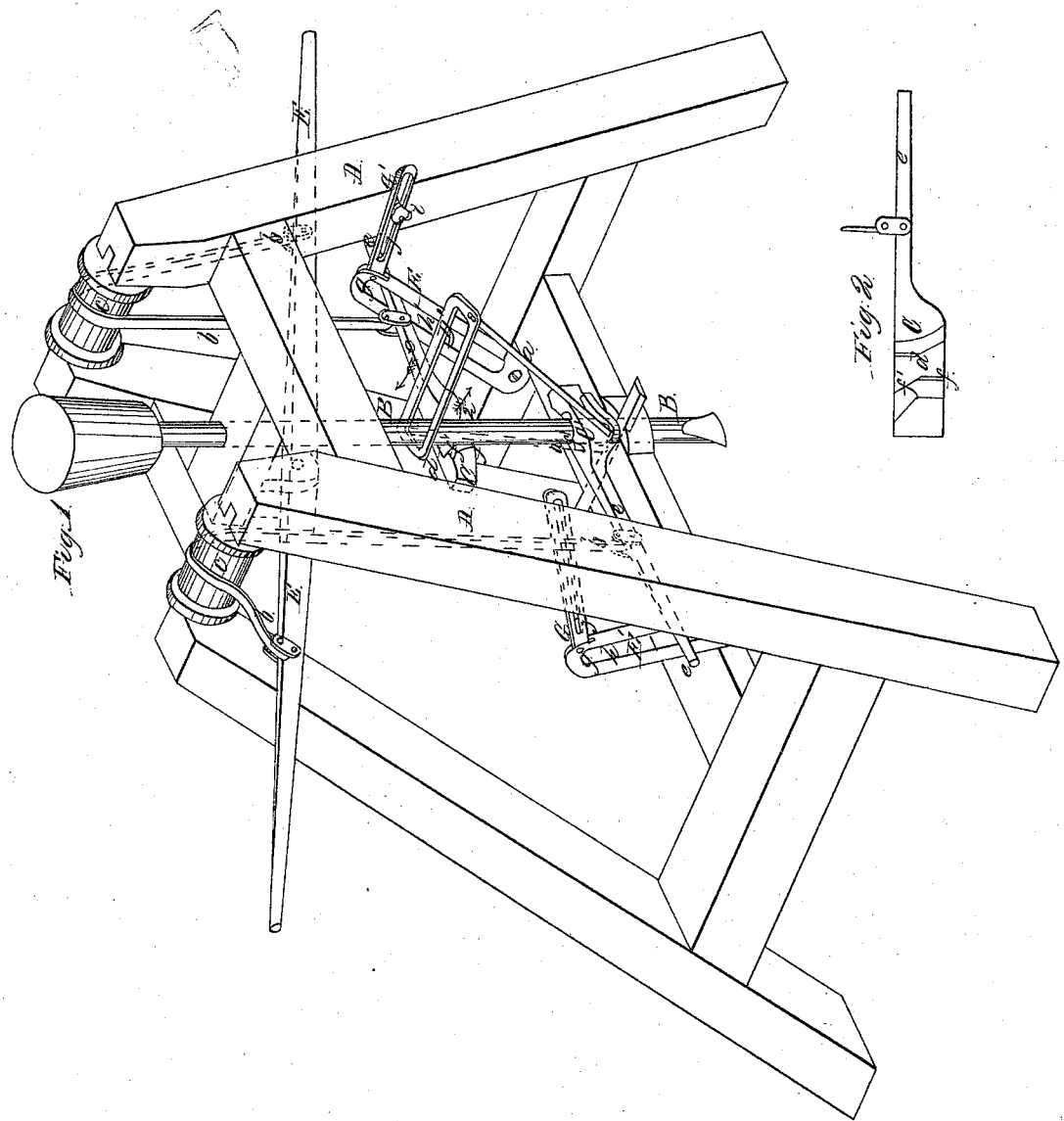

UNITED STATES PATENT OFFICE.

WM. LEWIS, OF HARRISBURG, PENNSYLVANIA.

ROCK-DRILL.

Specification of Letters Patent No. 21,140, dated August 10, 1858.

*To all whom it may concern:*

Be it known that I, WM. LEWIS, of Harrisburg, in the county of Dauphin and State of Pennsylvania, have invented a new and useful Improvement in Rock-Drills; and I do hereby declare that the following is a full, clear, and exact description of the same, reference being had to the accompanying drawings, forming a part of this specification, in which—

Figure 1, is a perspective view of the rock drill. Fig. 2, is a side view of one of the lifters.

Similar letters of reference, in each of the several figures indicate corresponding parts.

The nature of my invention consists—
1. In the combination of the peculiarly constructed lifting jaw with the peculiarly constructed vibrating flexible frame and inclined planes whether operated by a lever or other mechanical device. 2. In the peculiarly constructed vibrating flexible frame for holding the lifters together, and shifting them out of the way alternately. 3. In the united use of the lever and strap for operating the lifting jaw, incline plane for turning the bar, and flexible vibrating frame for throwing the jaw out of gear with the drill bar, all substantially as hereinafter described.

To enable others, skilled in the art, to make and use my invention, I will proceed to describe its construction and operation.

A, represent the frame of the drill, and B, the drill bar.

C, C', are lifting jaws, they are arranged on the front and rear sides of the drill bar, being held in proper relation to the drill bar by means of guide rods $a$, $a$, of a vibrating flexible frame D, and combined with a pivoted vibrating cross head or lever E, by means of straps $b$, $b$, which pass over barrel pulleys $c$, $c$, as shown. On the inner side of these lifting jaws, a recess $d$, which is flaring from the center of its length in opposite directions, is formed, so as to take hold of the drill bar alternately. The recesses $d$, $d$, are shaped as shown in Fig. 2, so that when the extension end $e$, of either of the jaws is raised higher than the jaw itself, the lower flaring portion $f$, of the recess will bite upon the bar and hold it firmly while being lifted. As soon as the bar is lifted to the proper height, the extension end of the jaw in operation, comes in contact with the upper parts $g$, of one of the inclined planes E', E', and thereby throws the jaw upward and causes it to release its hold upon the bar, the flaring part $f'$, of the recess $d$, allowing the jaw to be thus thrown up. When the jaw is thrown up as just stated the drill bar falls—the other jaw having assumed its position on the horizontal plate ready to receive the bar after it has fallen. As soon as the bar and jaw C, have fallen, the jaw C', takes hold of the bar and lifts it, and at the same time causes the vibrating frame D, and the inoperative jaw to move laterally out of the way in the direction indicated by the arrow 2. A similar movement of the frame and jaw C', takes place when C, again comes into operation.

The incline planes E', E', are formed by cutting slots $h$, $h'$, in inclined bars, and the connection between the jaws and the inclined planes, is formed by passing the extension ends of the jaws through the slots $h$, $h'$, as shown. The incline slots cause the extension ends of the jaws to be deflected in the path of a circle and consequently the jaws give a gradual circular motion to the drill bar.

G, G', are slotted arms of the inclined planes, they are fastened to the frame A, by set screws $i$. By loosening the set screws which pass through the slots $j$, and sliding the arms in or out, the extent of the obliquity to a vertical line of the incline planes can be changed and thus the extent of circular movement at each stroke of the drill regulated as may be necessary to suit the character of work being performed.

The frame D, is employed so as to hold the lifting jaws together, and it is made flexible and arranged to vibrate so as not to interfere with the necessary movements of said jaws. It likewise answers as a stop to prevent a too great upward movement of the jaws, and to aid in throwing the jaws out of gear with the drill bar which operation is mainly effected by the extension ends of the jaws coming in contact with the inclined planes at the termination of the oblique slots $h$, $h'$.

I have described the machine as working with two jaws, but it is obvious that only one need be used, but in this case the bar will be raised but half as often in a given time.

What I claim as my invention and desire to secure by Letters Patent, is—

1. The combination of the peculiarly constructed lifting jaw C with the peculiarly constructed vibrating flexible frame D, $a$, and inclined flanges E', E', whether operated by a lever or other mechanical device, substantially as set forth.

2. The peculiarly constructed vibrating flexible frame D, a, for holding the lifters together, and shifting them out of the way alternately, substantially as set forth.

3. The united use of the lever E, and strap b, for operating the lifting jaw C, incline plane E', for turning the bar B, and flexible vibrating frame D, a, for throwing the jaw out of gear with the drill bar B, substantially as and for the purposes set forth.

The above specification of my improvement in rock drills signed by me this second day of June 1858.

WILLIAM LEWIS.

Witnesses:
G. YORKE ATLEE,
A. W. FENWICK.